United States Patent

[11] 3,561,702

| [72] | Inventor | Edward B. Jones<br>General Delivery, Perryman, Md. 21130 |
|------|----------|----------------------------------------------------------|
| [21] | Appl. No. | 772,548 |
| [22] | Filed | Nov. 1, 1968 |
| [45] | Patented | Feb. 9, 1971 |

[54] SWEPT WING VARIABLE PITCH SAILPLANE
6 Claims, 3 Drawing Figs.

[52] U.S. Cl. ....................................... 244/16,
416/132, 244/123, 244/42, 244/48
[51] Int. Cl. ....................................... B64c 31/02
[50] Field of Search ....................................... 244/16, 13,
34, 35, 40, 42, 44, 48, 46, 45, 41, 75, 76, 123;
416/132, 240

[56] References Cited
UNITED STATES PATENTS

| 2,709,052 | 5/1955 | Berg | 244/35 |
| 3,438,597 | 4/1969 | Kasper | 244/16 |

*Primary Examiner*—Milton Buchler
*Assistant Examiner*—Steven W. Weinrieb
*Attorney*—Walter G. Finch

ABSTRACT: A sailplane is provided in which the line-of-lift of the wing is swept back from the longitudinal elastic axis to give an automatic wing twist with change of lifting force. In operation, a reduction in the angle of incidence from an updraught wind results in a trade of lift for greater forward thrust. An increase in angle of incidence from a downdraught wind results in a trade of forward momentum for greater lift. This is most effective under turbulent air conditions.

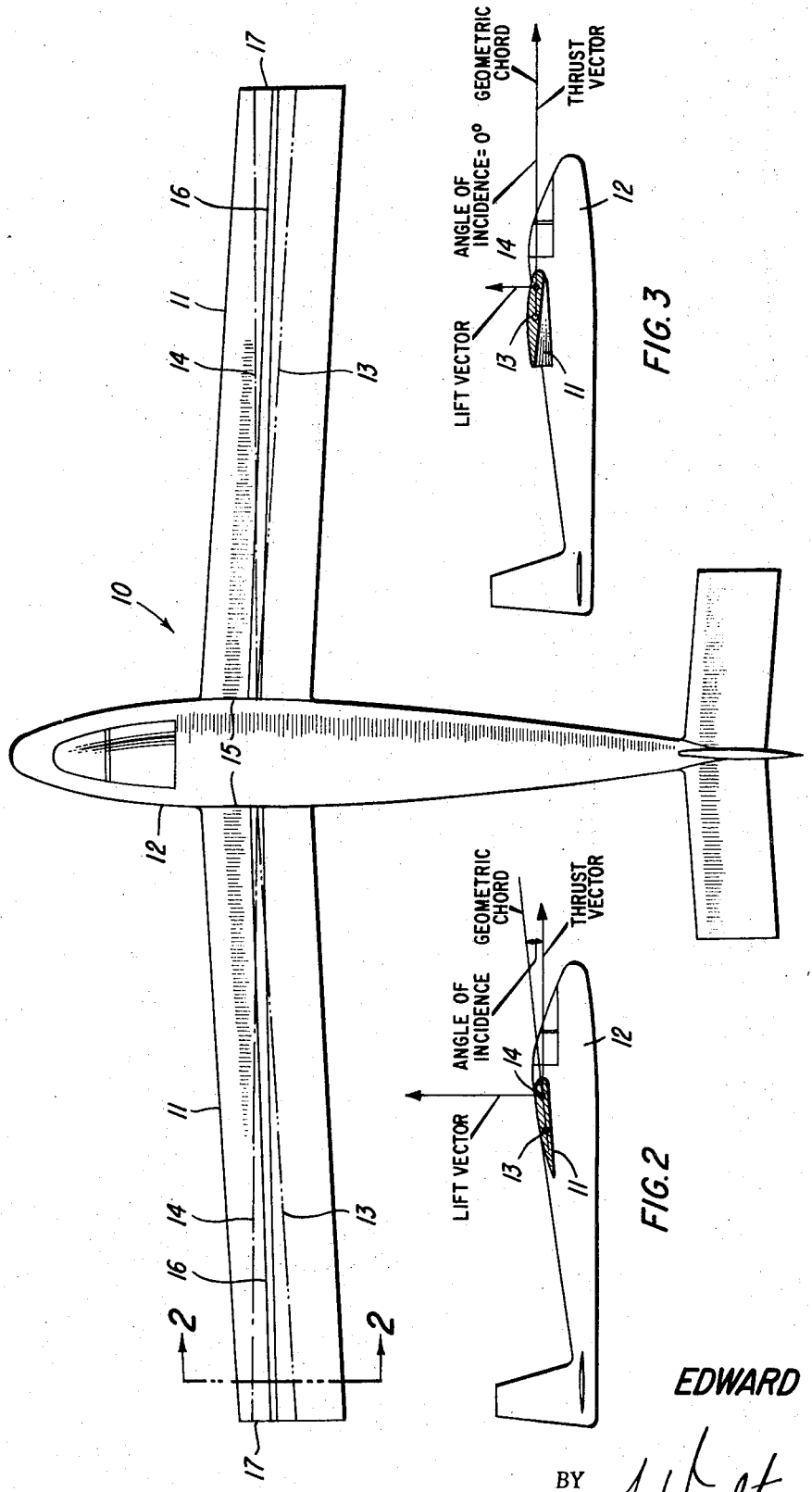
INVENTOR
EDWARD B. JONES
BY Walter G. Finch
ATTORNEY

SWEPT WING VARIABLE PITCH SAILPLANE

This invention relates generally to aircraft, and more particularly it pertains to a glider wing having an automatically variable incidence.

It has been conventional in the past to design the wings of aircraft so that all moments of force neutralize about the line-of-lift to eliminate twisting under stress. While this may be a desirable condition for powered aircraft, it does not necessarily hold true for sailplanes, as has been shown for Rogallo-type glider craft having membrane airfoils.

It is an object of this invention to provide an automatic angle of incidence wing which is especially effective under turbulent air conditions in order to increase the range of glides of the monoplane type.

Still another object of this invention is to provide a sailplane in which the line-of-lift of the wing is swept back from the longitudinal elastic axis to give an automatic wing twist with a change of lifting force.

Still even another object of this invention is to provide a sailplane system in which a reduction in the angle of incidence of the sailplane from an updraught wind results in a trade of lift for greater forward thrust and vice versa.

Other objects and attendant advantages of this invention will become more readily apparent and understood from the following detailed specification and accompanying drawings in which:

FIG. 1 is a diagrammatic plan view of a sailplane embodying features of this invention;

FIG. 2 is a schematic diagram taken as a chord section 2-2 near the wing tip of the sailplane of FIG. 1; and FIG. 3 is similar to the view of FIG. 2 showing the twisted wing.

Referring now to FIG. 1, there is shown a sailplane 10 with a wing 11 rigidly attached to fuselage 12 and showing the relative locations of the line of lift 13 and the axis of twist 14.

The line of lift 13 is the line parallel to the wing 11 along which all lifting forces are considered to be concentrated. It lies upon or very near the centerline of the wing 11.

The axis of twist 14 is an axis or line extending outward from the wing root 15 lying in the same plane as the wing 11 about which all parts of the wing tip 17 tend to rotate, and keeping the same relative orientation with the wing tip when a net vertical force (that which is imposed in flight) is applied to the upper or lower surface of the wing 11. For this invention, the wing 11 is designed so that the twist axis 14 lies forward of the centerline of lift 13 at any convenient angle between 0° and 90°.

The orientation of the twist axis 14 is determined by the relative location and strength of a spar 16 (or spars if more than one) within the wing 11, and also by the amount of sweep. The twist axis 14 may or may not pass through the tip 17 of the wing 11, but for proper operation of the wing 11 it must lie forward of the line of lift 13.

A force on the bottom of the wing 11 causes the mean angle of attack to decrease and convert some of the upward force to forward thrust. A force on top of the wing 11 causes the mean angle of attack to increase and again convert some of the downward force to forward thrust similar to the sail of a boat. The inertia of the sailplane 10 is the opposing force, and the greater the frequency of the gusts of wind, or the greater the speed of the sailplane 10 the more energy received per unit distance due to greater stability. There are other factors, however, such as increased rate of sink with an increase of speed which limit the speed of the sailplane 10 to some optimum point for any given set of conditions.

The essential difference, then, of this sailplane 10 over the conventional sailplane is that the wings 11 are designed to twist under stress. The wings of a conventional glider have all moments neutralized about the line of lift 13 to eliminate twisting under stress.

The operation of the novel wing 11 is illustrated in FIGS. 2 and 3. In FIG. 2, a condition of no updraft is assumed. There, therefore, is little or no upward force applied at the line of lift 13 of the wing 11, and consequently there is no appreciable turning moment about the axis of twist 14 of the wing 11. The wing incidence however is conductive to strong lift.

In FIG. 3, the condition of strong upward gusting exists and this force centering on the line of lift 13 causes a twist of the wing 11 to occur about axis of twist 14. Comparing FIGS. 2 and 3, then, under low upward (or even downward) gusting, the large angle of incidence as evidenced by the upward inclination of the geometric chord (curved arrows of FIG. 2) results in a greater lift vector at the expense of a lesser thrust vector to the sailplane 10 as a whole. Strong upward gusting of the air in the sailplane 10, on the other hand, with consequent twist of the wing 11 as related, reduces the angle of incidence toward or to zero as shown in FIG. 3 and the lift vector is reduced while the thrust vector gains.

In summation, it is obvious that the flight of the sailplane 10 is more stable under gusting conditions and flight duration thereof is extended.

Obviously many modifications and variations of the present invention are possible in light of the above teachings. It is, therefore, to be understood that within the scope of the appended claims the invention may be practiced otherwise than as specifically described.

I claim:

1. A sweptwing, variable pitch sailplane, comprising, structure having a fuselage and a sweptback wing rigidly affixed to each side of said fuselage, with the line of lift of each said wing being sweptback from the longitudinal line of twist to give an automatic wing twist with change of lifting forces on the wing of said sailplane.

2. The sailplane structure as recited in claim 1, wherein said line of twist is positioned forwardly of said line of lift at any predetermined angle between 0° and 90°.

3. The sailplane structure as recited in claim 1, wherein said line of twist is positioned forwardly of said line of lift and passes through the tip of said wing.

4. In combination, structure defining a sailplane having a fuselage and a sweptback wing rigidly affixed to each side of said fuselage, each said wing having a line of lift positioned substantially parallel to said wing along which all lifting forces are considered to be concentrated and a line of twist extending outwardly from the wing root lying in substantially the same plane as said wing about which all parts of the tip of said wing rotate to keep the same relative orientation with said wing tip when a net vertical force imposed in flight of said sailplane is applied to the upper as well as the lower surface of said wing, with said line of twist being positioned forwardly of said line of lift.

5. The sailplane structure as recited in claim 4, wherein said line of twist is positioned forwardly of the line of lift at any predetermined angle between 0° and 90°.

6. The sailplane structure as recited in claim 4, wherein said line of twist is positioned forwardly of said line of lift and passes through the tip of said wing.